United States Patent [19]

Maeda et al.

[11] Patent Number: 5,105,410

[45] Date of Patent: Apr. 14, 1992

[54] MULTI-BEAM OPTICAL PICK-UP

[75] Inventors: Ikuo Maeda; Hiroshi Gotoh, both of Kawasaki; Tatsuaki Sakurai, Yokohama, all of Japan

[73] Assignee: Ricoh Company, Ltd., Tokyo, Japan

[21] Appl. No.: 291,126

[22] Filed: Dec. 28, 1988

[30] Foreign Application Priority Data

Dec. 28, 1987 [JP] Japan ................................. 62-332123
Mar. 29, 1988 [JP] Japan ................................. 63-74948
May 25, 1988 [JP] Japan ................................. 63-127913

[51] Int. Cl.$^5$ .............................................. G11B 7/00
[52] U.S. Cl. ............................. 369/44.37; 369/112; 369/44.23; 369/44.24
[58] Field of Search ............... 369/44.37, 44.38, 46.23, 369/112, 109, 122, 110, 44.24, 100, 44.14, 106, 13, 124; 250/286, 201.5, 201.1, 204; 360/114; 350/6.5, 6.91, 162.2, 6.2

[56] References Cited

U.S. PATENT DOCUMENTS

| | | | |
|---|---|---|---|
| 4,507,763 | 3/1985 | Kato | 369/44.37 |
| 4,517,667 | 5/1985 | Sprague | 369/122 |
| 4,546,463 | 10/1985 | Ophei et al. | 369/110 |
| 4,694,443 | 9/1987 | Ando | 369/44.24 |
| 4,807,212 | 2/1989 | Kaneda et al. | 369/44.14 |
| 4,890,272 | 12/1989 | Ando | 369/44.24 |

FOREIGN PATENT DOCUMENTS

| | | |
|---|---|---|
| 57-60697 | 12/1982 | Japan . |
| 62-119744 | 6/1987 | Japan . |
| 62-119745 | 6/1987 | Japan . |
| 63-11726 | 1/1988 | Japan . |
| 63-11727 | 1/1988 | Japan . |
| 1-138627 | 5/1989 | Japan . |

Primary Examiner—Roy N. Envall, Jr.
Assistant Examiner—Thang V. Tran
Attorney, Agent, or Firm—Cooper & Dunham

[57] ABSTRACT

A multi-beam optical pick-up for use in an optical disc system includes a light source for emitting two light beams which are focused onto an optical disc to form two light spots thereon. The pick-up also includes an optical system to receive light reflected from the optical system and to divide the reflected light into a first light beam and a second light beam. Also provided in the pick-up are a first detector for detecting an opto-magnetic signal and a focusing error signal from the first light beam and a second detector for detecting a tracking error signal for the two light spots formed on the optical disc with respect to a desired recording track thereof.

25 Claims, 9 Drawing Sheets

(III)

(IV)

(V)

(VI)

(VII)

(VIII)

MULTI-BEAM OPTICAL PICK-UP

BACKGROUND OF THE INVENTION

1. Field of the Invention

This invention generally relates to an optical pick-up for use in an optical information recording and reproducing system, and, in particular, to a multi-beam optical pick-up using a multiple of beams for use in an optical disc system.

2. Description of the Prior Art

A multiple beam optical disc system in which a pair of light beams is focused onto a recording surface of an optical disc to form a pair of light spots located adjacent to each other so as to carry out a confirmed recording operation, i.e., recording followed by reproduction of recorded information for confirmation, and a multiple recording operation is well known. A multi-beam optical system for use in such a multi-beam optical disc system is described, for example, in Japanese Patent Post-examination Pub. No. 57-60697, Japanese Patent Laid-open Pub. Nos. 62-119744 and 62-119745 and Japanese Utility Model Laid-open Pub. Nos. 63-11726 and 63-11727. A multi-beam optical pick-up is also described in Japanese Patent Application No. 62-298652, which has been assigned to the assignee of this application and thus is hereby incorporated by reference, and from which a U.S. patent application Ser. No. 276,681 was filed on Nov. 28, 1988 claiming Priority.

In such a multi-beam optical pick-up, if two light beams are emitted from a light source, a first light beam is used for recording information and the remaining second light beam is used for reproducing the information just recorded by the first light beam for the purpose of confirmation. Thus, as compared with an optical pick-up using a single light beam, in accordance with such a multi-beam optical pick-up, recording and reproduction for confirmation can be carried out almost at the same time. Besides, since two or more light beams are used, a multiple recording or reproducing operation can be carried out.

However, in such a multi-beam optical pick-up, it is required to position two light beams properly at a desired recording track on the recording surface of an optical disc and, for this purpose, it is preferable to detect a tracking error for each of the light beams which impinges on the optical disc. Although various multi-beam optical pick-ups are proposed as noted above, none of them teaches providing a tracking servo control for each of the light beams used.

SUMMARY OF THE INVENTION

In accordance with one aspect of the present invention, there is provided a multi-beam optical pick-up using two light beams, in which a tracking error is detected for each of the two light beams. In a multi-beam optical pick-up of the present invention, two light beams are emitted from a light source, preferably a semiconductor laser array, and focused onto the recording surface of an optical disc to thereby form two light spots adjacent to each other. And, information is recorded on the optical disc using a first light beam and immediately thereafter the information thus recorded is reproduced by the remaining second light beam for confirmation. The multi-beam optical pick-up includes a beam splitting means for splitting a light beam reflected from the optical disc into two light beams, a first detecting means for detecting an opto-magnetic signal and a focus error signal from one of the two light beams split by the beam splitting means, and a second detecting means for detecting a tracking error signal for the two light spots on the optical disc by the other of the two light beams split by the beam splitting means. In this manner in accordance with this aspect of the present invention, use is preferably made of a semiconductor laser array as a light source for emitting two light beams, and the light beam reflected from the optical disc is split into two light beams by the beam splitting means. And, one of the two split light beams is used to detect an opto-magnetic signal and a focusing error signal, and the other of the two split light beams is used to detect a tracking error signal for each of the two light spots formed on the optical disc.

In accordance with another aspect of the present invention, there is provided a multi-beam optical pick-up using first and second light beams for use in an optical disc system, comprising: beam splitting means for splitting a light beam reflected from an optical disc into two light beams; astigmatism producing means for producing astigmatism in said reflected light beam; first light shielding means for shielding a part of one of the two light beams split by said beam splitting means at a first focal position; first light-receiving means for receiving the rest of said one of the two light beams split by said beam splitting means; second light shielding means for shielding a part of the other of the two light beams split by said beam splitting means at a second focal position; and second light-receiving means for receiving the rest of said the other of the two light beams split by said beam splitting means, whereby an RF signal, a tracking error signal and a focusing error signal are detected from each of the first and second light beams independently. In this aspect of the present invention, any light source may be used other than a semiconductor laser array, and it may also be so structured to detect an opto-magnetic signal. In accordance with this aspect of the present invention, astigmatism is applied to the light, including first and second light beams, reflected from the optical disc and the light is divided into two light beams. The first light beam component of one of the divided two light beams is blocked and the rest is received by a first 4-division light receiving element, and the second light beam component of the other of the divided two light beams is blocked and the rest is received by a second 4-division light receiving element.

In accordance with a further aspect of the present invention, there is provided a multi-beam optical pick-up for use in an optical disc system, which includes an optical detecting system for detecting a focusing error signal, a tracking error signal and an opto-magnetic signal from a light beam reflected from an optical disc, and the optical detecting system includes a 2-division half wavelength plate, a polarizer, an astigmatism producing means, and a 4-division light-receiving means. The astigmatism producing means may include a pair of condenser lens and a cylindrical lens or a pair of cylindrical lenses arranged with their generatrix axes perpendicular to each other.

It is therefore a primary object of the present invention to obviate the disadvantages of the prior art as described above and to provide an improved multi-beam optical pick-up.

Another object of the present invention is to provide an improved multi-beam optical pick-up using two separate light beams.

A further object of the present invention is to provide a multi-beam optical pick-up using a plurality of light beams, capable of detecting a tracking error of each of the light beams separately.

A still further object of the present invention is to provide an improved multi-beam optical pick-up suitable for use in an opto-magnetic type information recording and reproducing system.

A still further object of the present invention is to provide an improved multi-beam optical pick-up compact in size, reliable in operation and simple in structure.

Other objects, advantages and novel features of the present invention will become apparent from the following detailed description of the invention when considered in conjunction with the accompanying drawings

BRIEF DESCRIPTION OF THE DRAWINGS

FIG. 1b is a schematic illustration showing schematically in plan view the multi-beam optical pick-up shown in FIG. 1a;

FIGS. 1c-1 through 1c-3 and 1d-1 through 1d-3 are illustrations which are useful for understanding the operation of the multi-beam optical pick-up shown in FIGS. 1a and 1b;

FIG. 4b is an illustration showing the detailed structure of the half wavelength plate 70 provided in the structure shown in FIG. 4a;

DESCRIPTION OF THE PREFERRED EMBODIMENTS

Figure 1A:
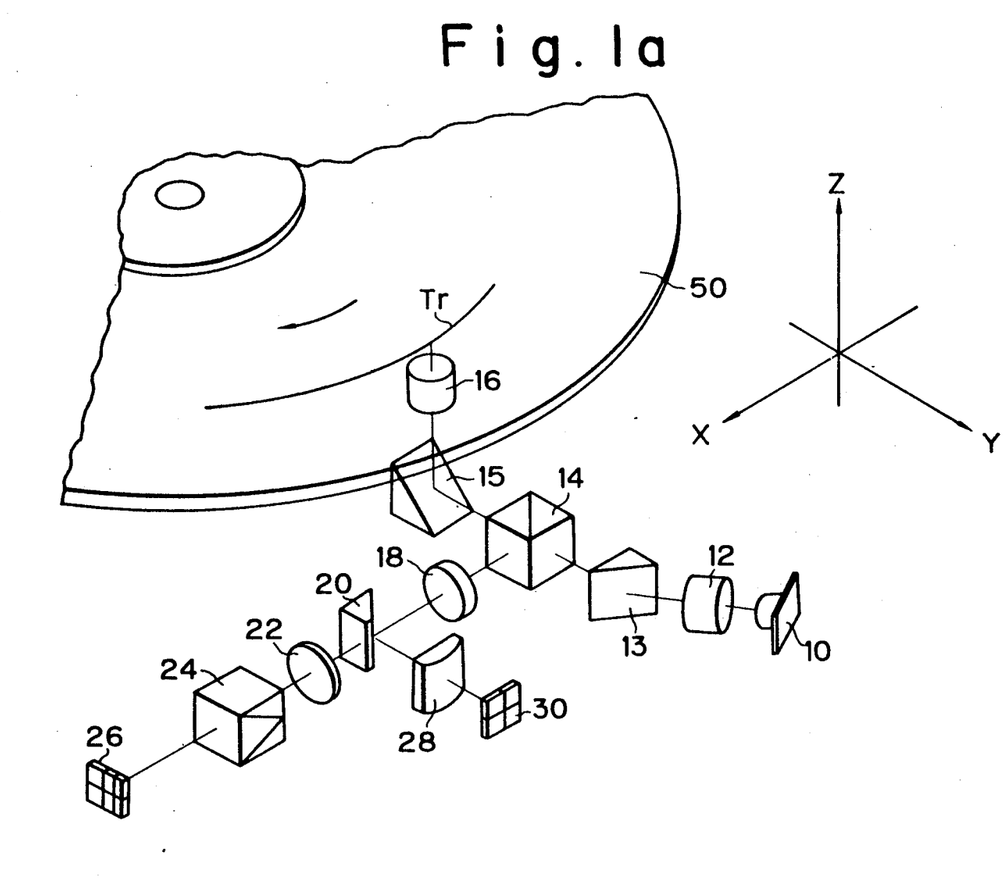
FIG. 1a is a schematic illustration showing schematically in perspective view a multi-beam optical pick-up for use in an optical disc system constructed in accordance with one embodiment of the present invention.
Figure 1B:
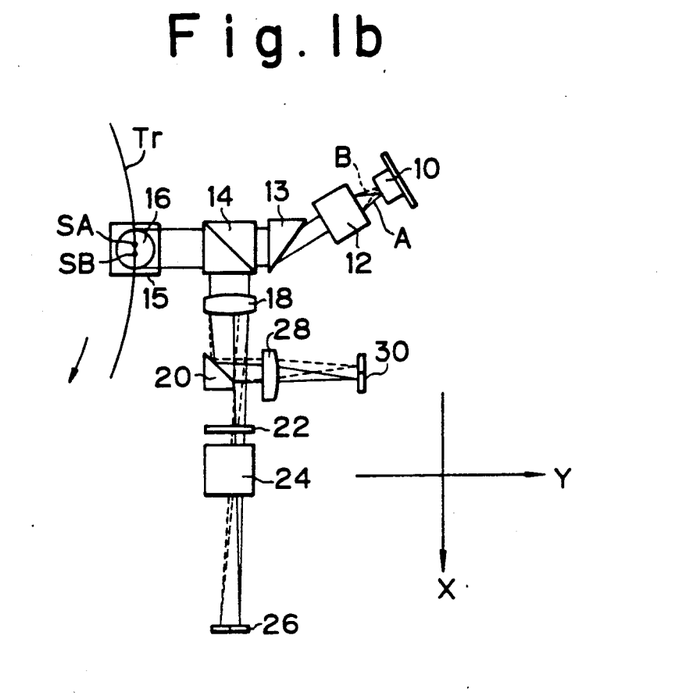

Referring now to FIG. 1a, there is shown schematically an optical disc system incorporating a multi-beam optical pick-up constructed in accordance with one embodiment of the present invention. As shown, the multi-beam optical pick-up includes a semiconductor laser array or simply LD array 10 which emits two separate light beams which pass through a common illumination optical system, including a coupling lens 12, a beam shaping prism 13, a beam splitter 14, a light beam deflecting mirror 15, and an objective lens 16. Then, the light beams are focused onto an optical disc 50 as a recording medium to thereby form two light spots thereon. As shown in FIG. 1b, the two light beams emitted from the LD array 10 are denoted by A and B and these light beams form respective light spots SA and SB on the same recording track Tr on the optical disc 50. Since the optical disc 50 rotates in the direction indicated by the arrow, the light spot SA leads the other light spot SB with respect to the direction of movement of the recording track Tr. In the illustrated embodiment, the leading light spot SA is used for recording information and the following light spot SB is used for reproducing the information recorded by the leading light spot SA for confirmation.

Then, as shown in FIG. 1a, the reflected light beams A and B from the optical disc 50 pass through the objective lens 16 and the light beam deflecting mirror 15 to enter the beam splitter 14 where the reflected light beams A and B are deflected by the beam splitter 14 to be separated away from the common illumination optical system and directed toward a condenser lens 18. Thus, the light beams are made convergent as they pass through the condenser lens 18 and then the convergent light beams are partly reflected by a knife edge prism 20, which serves as an optical path splitting means, with the rest of the convergent light beams being incident upon a half wavelength plate 22. That portion of the light beams which pass through the half wavelength plate 22 then passes through a Wollaston prism 24 to impinge upon a light-receiving device 26. On the other hand, that portion of the light beams which is reflected by the knife edge prism 20 passes through a cylindrical lens 28 to thereby impinge upon a light-receiving device 30. In the present embodiment, the condenser lens 18, the half wavelength plate 22, the Wollaston prism 24 and the light-receiving device 26 together define a first detecting means (optical system) and the cylindrical lens 28 and the light-receiving device 20, together with the condenser lens 18, define a second detecting means (optical system). Thus, the condenser lens 18 is commonly used for both of the first and second detecting means (optical systems).

When the light beams pass through the half wavelength plate 22, they rotate their direction of polarization approximately over 45 degrees. It is to be noted that the half wavelength plate 22 may be located between the beam splitter 14 and the Wollaston prism 24, if desired. When a light beams passes through the Wollaston prism 24, its S and P components are separated in the Z direction indicated in FIG. 1a. Besides, as indicated in FIG. 1b, the two light beams A and B incident upon the light-receiving device 26 are separated away from each other in Y direction with the leading light beam indicated by the solid lines and the following light beam indicated by the dotted lines. As a result, since each of the reflected two light beams A and B is divided into two light beams by the Wollaston prism 24, there are four separate light beams impinging upon the light-receiving device 26.

As shown in FIGS. 1c-1 through 1c-3, the light-receiving device 26 has a light-receiving surface which is divided into six separate light-receiving sections C through H, each of which outputs photo-electric conversion signals c through h in accordance with the amount of light received. It is to be noted that in the light-receiving device shown in FIGS. 1c-1 through 1c-3, the upper light-receiving sections C, E and G receive a S-polarization component and the lower light-receiving sections D, F and H receive a P-polarization component, and, moreover, it is so structured that the reflected trailing light beam B impinges upon the light-receiving sections C and D and the reflected leading light beam A impinges upon the light-receiving sections E, F, G and H. As shown in FIG. 1c-2, if the structure is such that the split light beams of the light beam A are focused on the dividing lines between the light-receiving sections E and G and F and H when the light spot SA of the light beam A is in focus, when the light beams A is defocused as shown in FIGS. 1c-1 and 1c-3, there is produced a difference in the amount of light received by the right and left light-receiving sections E and G and F and H, so that a focusing control operation can be carried out by using $(e+f)-(g+h)$ as a focus servo signal so as to keep the light beam A focused on the optical disc 50 at all times. Since the other trailing light beam B has a focal position close to that of the light beams A, the light beam B is automatically brought into a focused condition when the light beam A is focused. This focus servo control is of the well-known knife edge type and the knife edge mirror 20 serves as a knife edge.

Figure 2A:
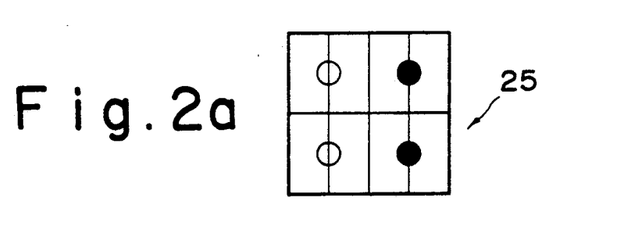
FIGS. 2a and 2b are illustrations showing two modifications of the multi-beam optical pick-up shown in FIGS. 1a and 1b.
Figure 2B:
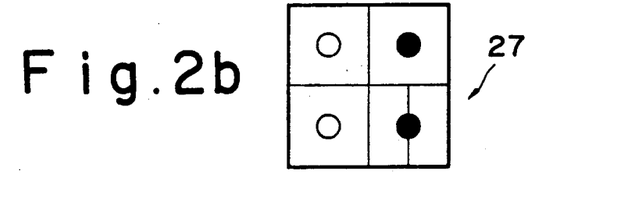

FIG. 2a illustrates another light-receiving device 25 which is a modification of the light-receiving device 26 and may be advantageously used in the multi-beam optical pick-up shown in FIGS. 1a and 1b. The light-receiving device 25 is of the 8-division type and thus each of the four light beams impinging upon the light-receiving device 25 is focused on a dividing line between corresponding two adjacent light-receiving sections when focused. In this case, a focus control operation can be carried out for each of the two light beams A and B. FIG. 2b illustrates a further light-receiving device 27 which is another modification of the light-receiving device 26 and may also be advantageously used in the multi-beam optical pick-up shown in FIGS. 1a and 1b. The light-receiving device 27 is of the 5-division type, and, in this modified structure, a focus control operation of the knife edge type can be carried out using the S-polarized component of the light beam A.

Figure 1C:
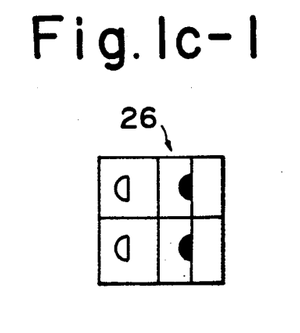
Figure 1C:
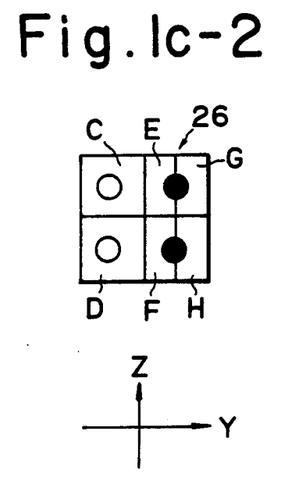
Figure 1C:
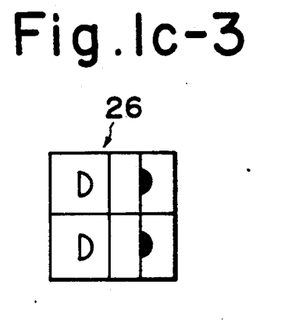
Figure 1D:
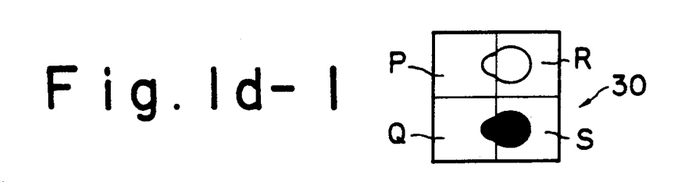
Figure 1D:
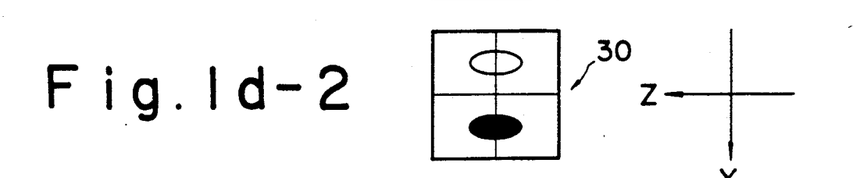
Figure 1D:
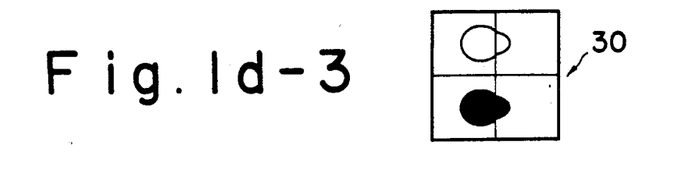

From the light-receiving device 26, a signal $(c-d)$ may be formed and it corresponds to a difference between the P-polarization component and the S-polarization component of the trailing light beam B so that this signal may be defined as an opto-magnetic signal which contains the information recorded on the optical disc 50. Thus, the opto-magnetic signal or information recorded on the optical disc 50 by the leading light beam A may be reproduced by the trailing light beam B to obtain the above-indicated opto-magnetic signal $(c-d)$ to confirm the data recorded by the leading light beam A on the optical disc 50. An opto-magnetic signal for the leading light beam A can be detected by using a signal $(e+g)-(f+h)$. In this manner, a focus servo (error) signal and an opto-magnetic signal can be detected by the first detecting means (optical system).

Now, detection of a tracking servo (error) signal by the second detecting means (optical system) of the present multi-beam optical pick-up will be described. Those portions of the light beams which are reflected by the knife edge mirror 20 pass through a cylindrical lens 28, which is arranged with its powerless direction in parallel with the Z direction as shown in FIG. 1b, whereby astigmatism is provided the passing light beams. And, the light beams from the cylindrical lens 28 impinge upon a light-receiving device 30 which has four divided light-receiving sections P, Q, R and S. The light beam A impinges upon the light-receiving sections Q and S and the other light beam B impinges upon the light-receiving sections P and R. Because of the astigmatism provided by the cylindrical lens 28, if the two light beams A and B form light spots SA and SB properly aligned on the same recording track Tr as shown in FIG. 1d-2, each of the light spots formed on the light-receiving device 30 is elliptic in shape with its longer axis in parallel with the Z axis with signals p, q, r and s output from the respective light-receiving sections P, Q, R and S having relationships of $p=r$ and $q=s$. Thus, when the light spots SA and SB formed on the optical disc 50 are shifted in position from the recording track Tr, the amount of light received by each of the paired light-receiving sections, i.e., P and R or Q and S, differ as shown in FIG. 1d-1 or 1d-3, so that a tracking servo (error) signal for the light beam A or B can be detected by a signal $(q-s)$ or $(p-r)$, respectively. And, by carrying out a tracking control operation according to the well-known push-pull method based on this tracking servo (error) signal, the light spots SA and SB can be properly maintained in alignment with the recording track Tr.

In this manner, desired data or information can be properly recorded on the optical disc 50 by the leading light beam A, and the trailing light beam B follows the same recording track Tr following the leading light beam A and thus it is modulated by the information which has just been recorded on the recording track Tr by the leading light beam A so that the information recorded on the recording track Tr by the leading light beam A can be confirmed by examining an output from the light-receiving device 26. It is to be noted that, when applied to the so-called write once type in which information may be written on an optical disc only once and cannot be rewritten, only the amount or intensity of the light reflected from the optical disc is of concern so that it is only necessary to produce such signals as $(p+r)$ and $(p+s)$.

Figure 3:
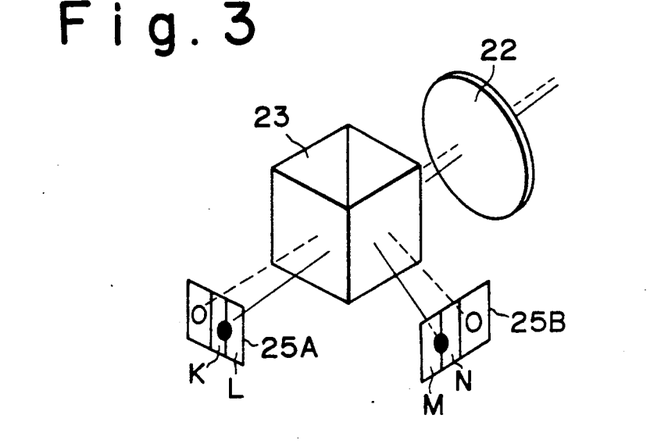
FIG. 3 is an illustration showing a multi-beam optical pick-up constructed in accordance with another embodiment of the present invention.

FIG. 3 illustrates a modification of the structure shown in FIG. 1a and it only illustrates the modified portion of the multi-beam optical pick-up. As shown in FIG. 3, the modified structure includes a combination of a polarizing beam splitter 23 and a pair of 3-division type light-receiving devices 25A and 25B in place of a combination of the Wollaston prism 24 and the light-receiving device 26. In this modified structure, signals k, l, m and n may be obtained from light-receiving sections K, L, M and N of these two light-receiving devices 25A and 25B, in which a focusing control operation for the light beam A can be carried out by using $(k+m)-(l+n)$ and an opto-magnetic signal of the light beam A can be detected by using $(k+l)-(m+n)$.

In the above-described embodiments, recording is effected by the leading light beam A and reproducing of recorded information for confirmation is effected by the trailing light beam B. However, alternatively, recording of information is effected by the trailing light beam B and reproducing of the recorded information for confirmation may be effected by the leading light beam A after one revolution of the optical disc 50. Thus, the two light beams A and B may be used in a variety of ways. For example, one of the two light beams A and B may be used for recording, erasing and reproducing of information while using the other light beam for confirmation of the operation carried out by the one light beam.

Figure 4A:
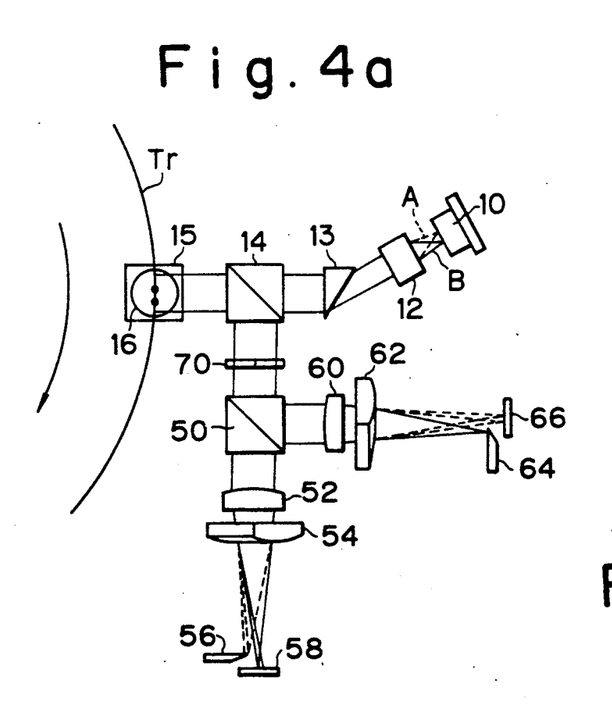
FIG. 4a is an illustration showing a multi-beam optical pick-up constructed in accordance with a further embodiment of the present invention.

FIG. 4a illustrates a multi-beam optical pick-up constructed in accordance with another embodiment of the present invention for use in an optical disc system in which an opto-magnetic signal is recorded and reproduced. Since the present optical pick-up is similar in many respects to the previously described embodiments, like elements are indicated by like numerals. The present optical pick-up includes an LD array 10 as a light source for emitting two separate light beams A and B which pass through a common illumination optical system to impinge upon a recording track Tr of an optical disc. And, the light beams reflected from the optical disc are deflected by a beam splitter 14 in the common illumination optical system to be separated away from the light beams incoming from the LD array 10 as in the manner similar to that described with respect to the previous embodiments.

Figure 4B:
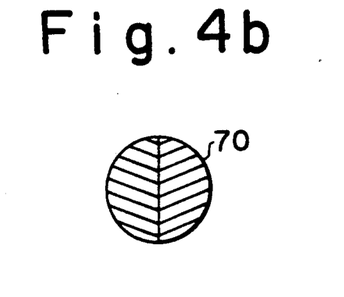

As shown in FIG. 4a, the reflected light beams from the optical disc are deflected by the beam splitter 14 and then pass through a 2-part half wavelength plate 70 to enter a polarizing beam splitter 50 which serves as an optical path dividing means. The detailed structure of the 2-part half wavelength plate 70 is schematically illustrated in FIG. 4b. Thus, the light beams entering into the polarizing beam splitter 50 is partly directed in a first detecting optical system and the rest is directed in a second detecting optical system. That is, the first detecting optical system includes a condenser lens 52 and a cylindrical lens 54 serving as an astigmatism producing means, and the second detecting optical system includes a condenser lens 60 and a cylindrical lens 62 serving as another astigmatism producing means. The first detecting optical system also includes a light-shielding or light-blocking member 56 for partly shielding or blocking the light beams from the cylindrical lens 54 and a 4-division type light-receiving device 58 for receiving that portion of the light beams which are not shielded or blocked by the member 56. Similarly, the second detecting optical system includes a light-shielding or light-blocking member 64 and a 4-division type light-receiving device 66.

Figure 7:
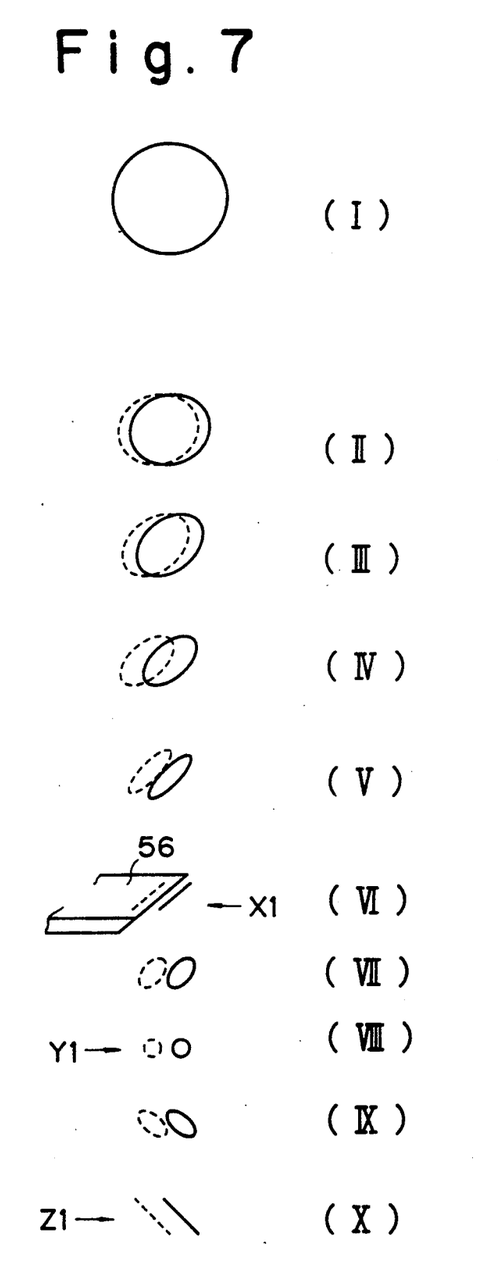
FIG. 7 is an illustration which is useful for understanding the principle of operation of the present invention.

That portion of the reflected light from the optical disc which passes straight through the beam splitter 50 is made convergent by the condenser lens 52 and then passes through the cylindrical lens 54 whereby astigmatism is provided. Thus, as shown in FIG. 7, the light passing through the cylindrical lens 54 is divided into a first divided light beam including a component of the first light beam A and a second divided light beam including a component of the second light beam B. In FIG. 7, how the reflected light beam from the optical disc is gradually divided into the first and second divided light beams due to the effect of astigmatism and how the cross-sectional shape of each of the divided light beams change its shape are shown as (I) through (X). Because of the focusing function of the condenser lens 52 and the astigmatic function of the cylindrical lens 54, the first and second divided light beams are focused at respective first focal line positions X1 (FIG. 7 (VI)) to form lines, and, then, they come to have circular cross sections at positions indicated by Y1 as shown by (VIII) and again form lines at respective focal positions Z1 as indicated by FIG. 7 (X).

As indicated in FIG. 7, the light-shielding member 56 is a plate having a knife edge and it blocks the first divided light beam corresponding to the reflected light component of the first light beam A. Thus, the second divided light beam corresponding to the reflected light component of the second light beam B impinges upon the light-receiving device 58. As set forth before, the light-receiving device 58 is of the 4-division type, including four separate light-receiving sections, and it is disposed at a position indicated by Y1 in FIG. 7. Through a combination of outputs from the four light-receiving sections of the light-receiving device 58 and the use of a 4-division light-receiving device, there can be obtained a RF signal, a tracking servo (error) signal and a focus servo (error) signal for the light beam B.

On the other hand, that portion of the reflected light beam which has been deflected by the polarizing beam splitter 50 is similarly made convergent by the condenser lens 60 and then astigmatism is provided when passing through the cylindrical lens 62. Thus, the light passing through the cylindrical lens 62 is gradually divided into a first divided light beam corresponding to the reflected light component of the first light beam A and a second divided light beam corresponding to the reflected light component of the second light beam B. And, in this second detecting optical system, the second divided light beam is blocked by the light-shielding member 64 and the unblocked first divided light beam impinges upon the 4-division light-receiving device 66 which is disposed at a position where the first divided light beam has a circular cross section. Thus, as appropriate combinations of outputs from the light-receiving device 66, there can be obtained a RF signal, a tracking servo (error) signal and a focusing servo (error) signal for the light beam A. Accordingly, in the present embodiment, a RF signal, a tracking servo (error) signal and a focusing servo (error) signal can be obtained for each of the light beams A and B independently from each other.

Figure 5:
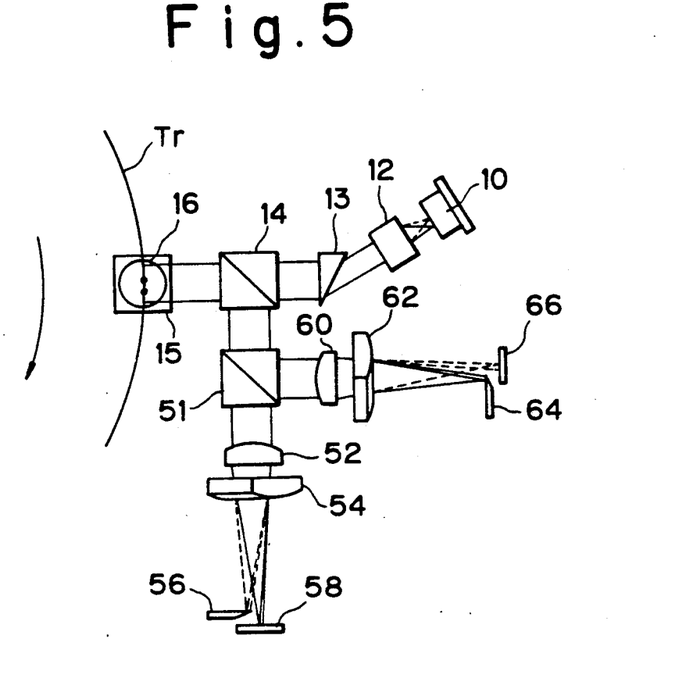
FIG. 5 is an illustration showing a multi-beam optical pick-up constructed in accordance with a still further embodiment of the present invention.

FIG. 5 illustrates a multi-beam optical pick-up constructed in accordance with a further embodiment of the present invention for use in a so-called write once type optical disc system, in which the intensity of reflected light from an optical disc is detected in place of an opto-magnetic signal as in the previously described embodiments. Thus, in the present embodiment, use is made of an ordinary beam splitter 51 in place of a combination of the 2-part half wavelength plate 70 and the polarizing beam splitter 50, and other than that the embodiment of FIG. 5 is structurally similar to the embodiment shown in FIG. 4a. Thus, also in the embodiment shown in FIG. 5, there can be obtained a RF signal, a tracking servo (error) signal and a focusing servo (error) signal for each of the light beams A and B independently from each other in a manner similar to that of the embodiment shown in FIG. 4.

Figure 6:
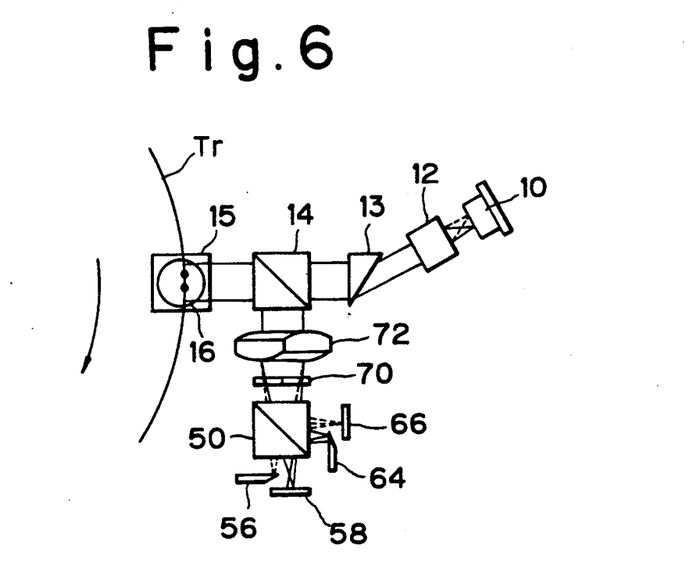
FIG. 6 is an illustration showing a multi-beam optical pick-up constructed in accordance with a still further embodiment of the present invention.

FIG. 6 illustrates multi-beam optical pick-up which is a modification of the multi-beam optical pick-up shown in FIG. 4a. In this modified embodiment, use is made of a composite lens 72 which is comprised of a pair of cylindrical lenses combined with their genetratrix axes extending perpendicular to each other and thus which serves as an astigmatism producing means. The composite lens 72 is located between the beam splitter 14 and the 2-part half wavelength plate 70. As compared with the embodiment shown in FIG. 4a, this embodiment requires only one astigmatism generating means so that the overall structure may be made smaller in size.

Figure 8:
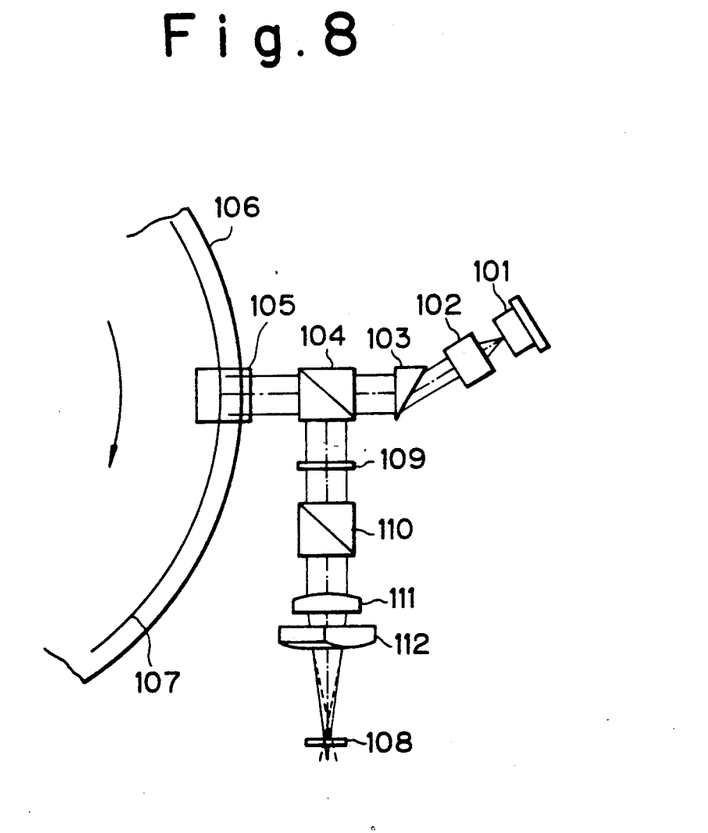
FIG. 8 is a schematic illustration showing in plan view a multi-beam optical pick-up constructed in accordance with a still further embodiment of the present invention.

FIG. 8 illustrates an optical pick-up constructed in accordance with a still further embodiment of the present invention for use in an optical disc system. As shown, the illustrated optical pick-up includes a semiconductor laser 101 as a light source for emitting a light beam. The light beam emitted from the semiconductor laser 101 passes through a coupling lens 102 to be collimated and the collimated light beam is shaped to have a circular cross section when passing through a beam shaping prism 103. Thereafter, the light beam thus shaped passes through a beam splitter 104, a deflecting mirror 105 and an objective lens (not shown) to impinge upon an opto-magnetic or optical disc as an optical recording medium at a desired recording track 107 thereof in the form of a light spot.

Figure 9:
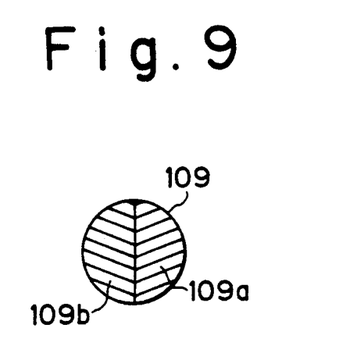
FIG. 9 is an illustration showing the detailed structure of the half wavelength plate 109 provided in the structure shown in FIG. 8.
Figure 10:
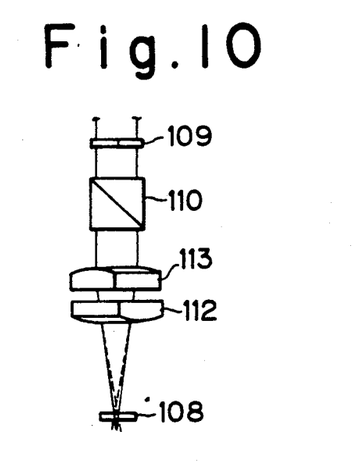
FIG. 10 is a schematic illustration showing a modification of the structure shown in FIG. 8.

The light reflected from the disc 106 again passes through the objective lens and the beam splitter 104 where the reflected light beam from the disc 106 is deflected and thus separated away from the incoming light beam from the semiconductor laser 101. Thus, the reflected light beam deflected by the beam splitter 104 is now directed to a detecting optical system which includes a 2-part half wavelength plate 109, a polarizer 110, a condenser lens 111, a cylindrical lens 112 and a 4-division light-receiving device 108. The 2-part half wavelength plate 109 includes a right half section 109a and a left half section 109b which are combined at the center as shown in FIG. 9. One of the right and left half sections 109a and 109b has an advance phase axis of $+22.5°$ with respect to the horizontal direction and the other has a lag phase axis of $-22.5°$ with respect to the horizontal direction. In the embodiment shown in FIG. 9, the right half section 109a has an angle of $+22.5°$ and the left half section 109b has an angle of $-22.5°$. A combination of the condenser lens 111 and the cylindrical lens 112 serves to produce astigmatism for the light beam directed to the 4-division light-receiving device 108. Thus, for example, as shown in FIG. 10, use may also be made of a cylindrical lens 113 arranged with its generatrix line extending normal to the generatrix line of the cylindrical lens 112 in place of the condenser lens 111.

Figure 11A:
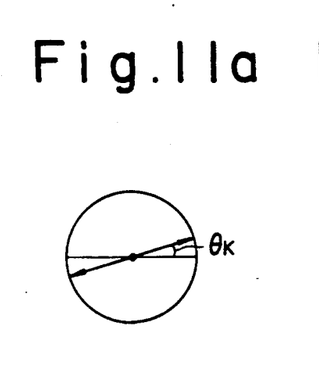
FIGS. 11a through 11c and 12a through 12c are illustrations which are useful for understanding the principle of operation of the structure shown in FIG. 8.

With this structure, the light beam reflected by the disc 106 and deflected by the beam splitter 104 contains a tracking error signal in a direction perpendicular to the plane of the drawing of FIG. 8. In other words, as a tracking error occurs, there is produced a difference in the amount of light at top and bottom of the light beam. The light beam then impinges upon the 2-part half wavelength plate 109 having the structure shown in FIG. 9. If a light beam having a plane of polarization inclined over angle $+\theta_k$ due to the opto-magnetic Kerr effect (FIG. 11a shows the condition after deflection by the beam splitter 104) is incident upon the half wavelength plate 109, the light beam after passing through the half wavelength plate 109 will have a direction of polarization which is $45°\theta_k$ in the right half section and $45° + \theta_k$ in the left half section. As a result, in the right half section 109a, we have P component: S component = $\cos(45° - \theta_k)$: $\sin(45° - \theta_k)$ and, in the left half section 109b, we have P component: S component = $\cos(45° + \theta_k)$: $\sin(45° + \theta_k)$.

It should thus be understood that a relationship between the magnitude of a P component and the magnitude of an S component is reversed between the right and left half sections 109a and 109b. Moreover, if the light beam after deflection by the beam splitter 104 has a plane of polarization inclined at $-\theta_k$ as shown in FIG. 12a, the condition of the light beam after passing through the 2-part half wavelength 109 is reversed between left and right as compared with the previous case as shown in FIG. 12b. As different from the case shown in FIG. 11b, in the present case shown in FIG. 12b, we have, in the right half section 109a, P component: S component = $\cos(45° + \theta_k)$: $\sin(45° + \theta_k)$ and, in the left half section 109b, we have P component: S component = $\cos(45° - \theta_k)$: $\sin(45° - \theta_k)$.

It may be noted that also in this case the relationship between the magnitude of a P component and the magnitude of an S component is reversed between the right and left half sections 109a and 109b.

Figure 11B:
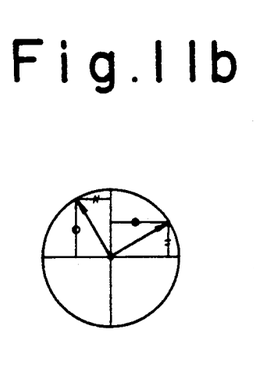
Figure 11C:
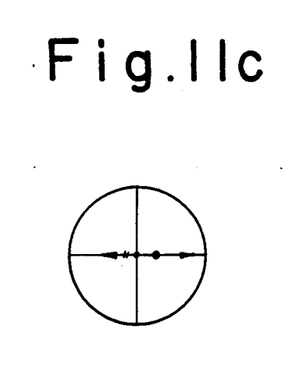
Figure 12A:
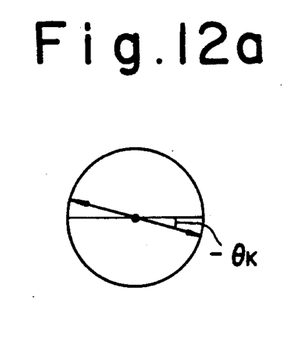
Figure 12B:
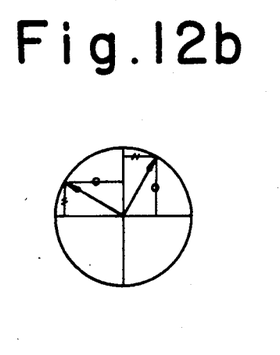
Figure 12C:
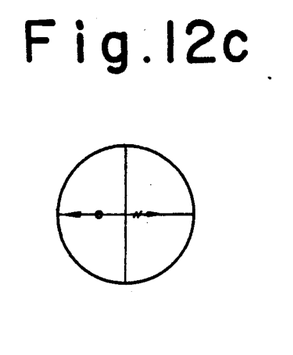

Thus, it may be understood that the characteristic of polarization of the light after passing through each of the right and left half sections of the 2-part half wavelength plate 109 is diametrically opposite between the two cases, in which the angle of the plane of polarization of the reflected light from the disc 106 is $+\theta_k$ and $-\theta_k$, as shown in FIGS. 11b and 12b. If the light beam which has passed through the 2-part half wavelength plate 109 is passed through a polarizer 110 which only allows its P component to pass, the characteristic of the light beam shown in FIG. 11c after passing through the polarizer 110 is obtained in the case of FIG. 11b and the characteristic shown in FIG. 12c is obtained in the case of FIG. 12b. That is, in the case of $+\theta$, we have right half: left half = $\cos(45° - \theta_k)$: $\sin(45° - \theta_k)$ and, on the other hand, in the case of $-\theta_k$, we have right half: left half = $\sin(45° - \theta_k)$: $\cos(45° - \theta_k)$.

As a result, the light beam after passing through the polarizer 110 will have an opto-magnetic signal in the left and right direction. Thus, the light beam incoming into the condenser lens 111 will contain a tracking servo (error) signal component in the direction perpendicular to the plane of the drawing of FIG. 8 and an opto-magnetic signal component in the left and right direction.

Figure 13A:
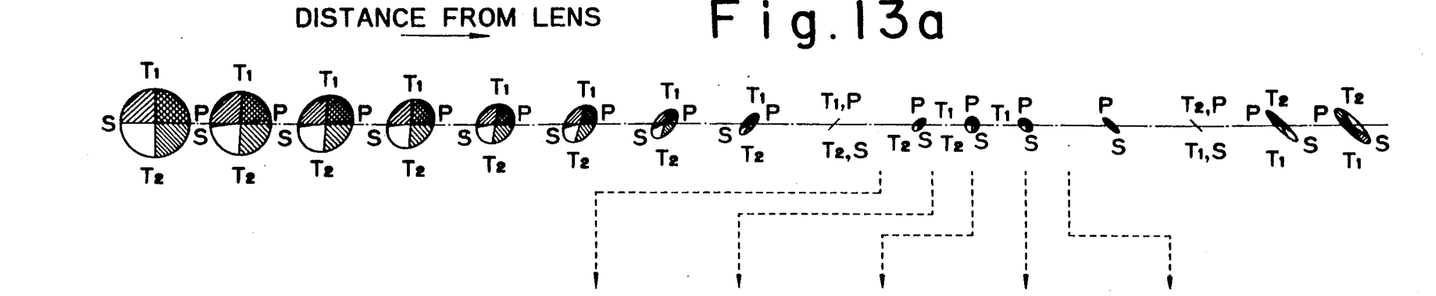
FIGS. 13a through 13d are illustrations which are also useful for understanding the principle of operation of the structure shown in FIG. 8.

Now, a function provided by a combination of the condenser lens 111 and the cylindrical lens 112 or a pair of cylindrical lenses 12 and 13 arranged with their generatrix lines perpendicular to each other will be described. A combination of these lenses 111 and 112 serves to produce an astigmatism effect in a light beam passing therethrough. With the cylindrical lens 112 arranged with its generatrix line inclined at 45° as shown in FIG. 8, there is obtained an astigmatic effect as shown in FIG. 13a. In FIG. 13a, in order to facilitate the understanding, tracking servo (error) signal components in the vertical direction are indicated by $T_1$ and $T_2$ and right and left opto-magnetic signal components are indicated by P and S. A series of astigmatic effects shown in FIG. 13a show a variation from left to right as the distance from the objective lens is made larger. (That is, in FIG. 13a, it is assumed that the 4-division light-receiving device 108 is moved fore and aft of its focal position; however, in reality, the 4-division light-receiving device 108 is fixed in position at its focal position where the light beam has a true circular cross section and the image forming position is shifted fore and aft of the focal position due to defocused condition, which is functionally equivalent to the case when the 4-division light-receiving device 108 is shifted in position relatively.) As shown in FIG. 13a, the tracking servo (error) signal components $T_1$ and $T_2$ and the opto-magnetic signal components P and S gradually merge as they rotate, and, at a location where the light beam has a true circular cross section between two focal lines, the tracking servo (error) signal components $T_1$ and $T_2$ are separated away from each other horizontally and the opto-magnetic signal components P and S are separated away from each other vertically. Therefore, if the 4-division light-receiving device 108 having four separate light-receiving sections A through D as shown in FIGS. 13b through 13d is located at this position, there can be obtained a tracking servo (error) signal as $(A+D)-(B+C)$ as shown in FIG. 13c and an opto-magnetic signal as $(A+B)-(C+D)$ as shown in FIG. 13d.

Figure 13B:
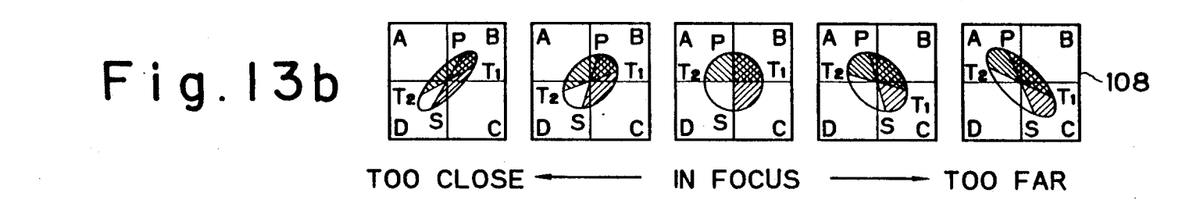
Figure 13C:
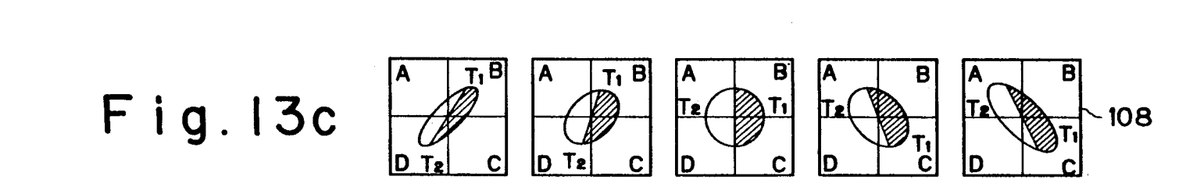
Figure 13D:
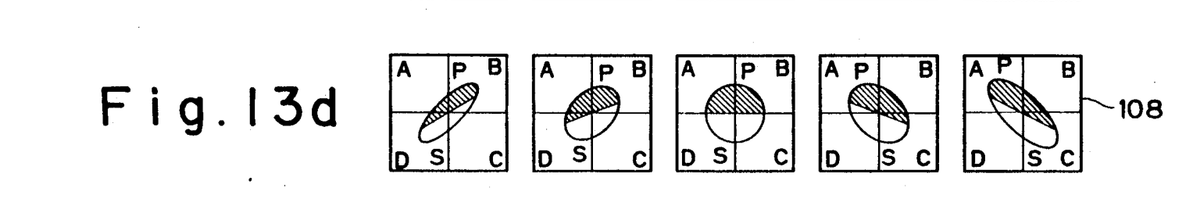

When defocused, the true circular cross section as indicated at the center diagram of FIG. 13b becomes elliptic in shape, whereby a focusing servo (error) signal may be obtained by $(A+C)-(B+D)$; however, since the relative magnitude relationship between the amounts of light of the tracking servo (error) signal components $T_1$ and $T_2$ which have been divided horizontally remains the same and also the relative magnitude relationship between the amounts of light of the opto-magnetic signal components P and S which have been divided vertically remains the same, the fact that a tracking servo (error) signal can be obtained by $(A+D)-(B+C)$ and an opto-magnetic signal can be obtained by $(A+B)-(C+D)$ remains the same as the case where the cross sectional shape is true circular. That is, only from the single 4-division light-receiving device 108, there is obtained not only a focusing servo (error) signal due to an astigmatic method, but also a tracking servo (error) signal as well as an opto-magnetic signal.

As modifications of the structure shown in FIG. 8, the 2-part half wavelength plate 109 may be adhesively attached to the polarizer 109 and the condenser lens 11 may be fixedly attached to the cylindrical lens 112 to apparently reduce the number of parts. The optical pick-up shown in FIG. 1 and described above is intended to be used in an optical disc system using an opto-magnetic disc 106 so that an opto-magnetic signal must be optically read by detecting the direction of polarization. However, in applications to non-eraseable type optical disc systems where information may only be recorded but cannot be erased, such as the write once type optical disc system, since it is only necessary to detect the intensity or amount of light of the reflected light from an optical disc, i.e., a sum $(A+B+C+D)$ of outputs from the 4-division type light-receiving device 108, the optical pick-up of the present embodiment may also be used for such write once type optical disc system. If it is to be used only for such write once type optical disc system, then the 2-part half wavelength plate 109 and the polarizer 110 may be discarded.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A multi-beam optical pick-up, comprising:
   a semiconductor laser array for emitting two separate light beams;
   a first optical system for receiving said two light beams emitted from said semiconductor laser array and focusing said two light beams onto an optical disc to thereby form two light spots thereon;
   a second optical system for receiving reflected light from said optical disc, said second optical system including knife edge prism serving as splitting means for deflecting a portion of said reflected light into a first divided light beam and the rest of reflected light beam into a second divided light beam;
   first detecting means disposed to receive said first divided light beam for producing an information signal and a focusing error signal for controlling the focus of said two light beams emitted from said semiconductor laser array on said optical disc when either recording information on or reproducing information from said optical disc; and
   second detecting means disposed to receive said second divided light beam for producing a tracking error signal for both of said light spots on said optical disc.

2. The pick-up of claim 1, wherein said first optical system includes a coupling lens, a beam shaping prism, a beam splitter, a mirror and an objective lens arranged in the stated order along a first optical path extending from said semiconductor laser array to said optical disc, wherein said beam splitter directs said reflected light from said optical disc in a direction away from said first optical path.

3. The pick-up of claim 2, wherein said second optical system includes a condenser lens for receiving said reflected light from said optical disc after deflection by said beam splitter and said knife edge prism serving as said splitting means arranged along a second optical path, wherein said knife edge prism deflects a portion of said reflected light from said optical disc in a direction along a third optical path while allowing the rest of said reflected light to travel along said second optical path.

4. The pick-up of claim 3, wherein said first detecting means includes a half wavelength plate, a Wollaston prism and a multi-division type light-receiving device which are arranged in the stated order along said second optical path, wherein said multi-division type light-receiving device includes a plurality of separate light-receiving sections for outputting a plurality of outputs which are combinable to produce said opto-magnetic signal and said focusing error signal.

5. The pick-up of claim 4, wherein said multi-division type light-receiving device has at least four separate light-receiving sections, at least one of which is further divided into two separate sub-sections.

6. The pick-up of claim 3, wherein said second detecting means includes a condenser lens and a multi-division type light-receiving device which are arranged in the stated order along said third optical system.

7. The pick-up of claim 3, wherein said first detecting means includes a half wavelength plate for receiving said light passing through said knife edge prism, a polarizing beam splitter for splitting said light into two light beams, a first multi-division type light-receiving device for receiving one of said two light beams split by said polarizing beam splitter and a second multi-division type light-receiving device for receiving the other of said two light beams.

8. The pick-up of claim 2, wherein said splitting means in said second optical system splits said reflected light into light passing through the splitting means and light deflected by the splitting means, and said first detecting means includes first dividing means for dividing said light passing through said splitting means into a first light beam corresponding to one of said two separate light beams emitted from said semiconductor laser array and a second light beam corresponding to the other of said two separate light beams; first shielding means for shielding said first light beam; and a first multi-division type light-receiving device for receiving said second light beam, and said second detecting means includes second dividing means for dividing said light deflected by said splitting means into a third light beam corresponding to one of said two separate light beams emitted from said semiconductor laser array and a fourth light beam corresponding to the other of said two separate light beams; second shielding means for shielding said fourth light beam; and a second multi-division type light-receiving device for receiving said third light beam.

9. The pick-up of claim 8, wherein each of said first and second dividing means includes a condenser lens and a cylindrical lens.

10. The pick-up of claim 9, wherein each of said first and second shielding means includes a knife edge.

11. The pick-up of claim 8, wherein said second optical system includes a 2-part half wavelength plate for receiving said reflected light deflected by said beam splitter and a polarizing beam splitter serving as said splitting means of said second optical system.

12. A multi-beam optical pick-up, comprising:
a light source for emitting two separate light beams;
a first optical system for receiving said two light beams emitted from said light source and having them focused onto an optical disc to thereby form two light spots thereon;
a second optical system for receiving reflected light from said optical disc, said second optical system including splitting means for splitting said reflected light into a first light beam and a second light beam;
first applying means for applying an astigmatic effect to said first light beam to further divide said first divided light beam into a third light beam corresponding to one of said two separate light beams emitted from said light source and a fourth light beam corresponding to the other of said two separate light beams;
first shielding means for shielding said third light beam;
first detecting means disposed to receive said fourth light beam;
second applying means for applying an astigmatic effect to said second light beam to further divide said second light beam into a fifth light beam corresponding to one of said two separate light beams emitted from said light source and a sixth light beam corresponding to the other of said two separate light beams;
second shielding means for shielding said sixth light beam; and
second detecting means disposed to receive said fifth light beam, whereby at least one of an RF signal, a tracking error signal and a focusing error signal is produced from each of said first and second detecting means.

13. The pick-up of claim 12, wherein said second optical system includes a 2-part half wavelength plate through which said reflected light passes before reaching said splitting means of said second optical system.

14. The pick-up of claim 13, wherein said 2-part half wavelength plate has a right half and a left half which are different in the orientation of a plane of polarization.

15. The pick-up of claim 12, wherein each of said first and second applying means includes a condenser lens and a cylindrical lens.

16. The pick-up of claim 12, wherein each of said first and second shielding means includes a knife edge.

17. A multi-beam optical pick-up, comprising:
a light source for emitting two separate light beams;
a first optical system for receiving said two light beams emitted from said light source and having them focused onto an optical disc to thereby form two light spots thereon;
a second optical system for receiving reflected light from said optical disc, said second optical system including applying means for applying an astigmatic effect to said reflected light from said optical disc to divide said reflected light into a first light beam corresponding to one of said two separate light beams emitted from said light source and a second light beam corresponding to the other of said two separate light beams and splitting means for splitting said first light beam into third and fourth light beams and said second light beam into fifth and sixth light beams;
first shielding means for shielding said third light beam;
first detecting means disposed to receive said fourth light beam;
second shielding means for shielding said sixth light beam; and
second detecting means disposed to receive said fifth light beam;
each of said first and second detecting means producing at least one of an RF signal, a tracking error signal and a focusing error signal.

18. The pick-up of claim 17, wherein said second optical system further includes a 2-part half wavelength plate disposed between said applying means and said splitting means.

19. The pick-up of claim 18, wherein said 2-part half wavelength plate has a right half and a left half which are different in the orientation of a plane of polarization.

20. The pick-up of claim 17, wherein said applying means includes a composite cylindrical lens comprised of a pair of cylindrical lenses which are arranged with their generatrix axes extending perpendicular to each other.

21. An optical pick-up, comprising:
a semiconductor laser for emitting at least one laser beam;

a first optical system for receiving said laser beam emitted from said semiconductor laser and focusing said laser beam onto an optical disc to form a laser spot thereon;

a second optical system for receiving a reflected light beam from said optical disc, said second optical system including a 2-part half wavelength plate, a polarizer and applying means for applying an astigmatic effect to said reflected light after passing through said 2-part half wavelength plate and said polarizer to thereby deform a cross sectional shape of said reflected light beam due to astigmatism; and a multi-division light receiving means for receiving said reflected light beam from said applying means, wherein said multi-division light receiving means supplies a focusing error signal, a tracking error signal and an information signal carrying information recorded on said optical disc.

22. The optical pick-up of claim 21, wherein said first optical system includes a coupling lens, a beam shaping prism, a beam splitter, a mirror and an objective lens arranged in the order mentioned along a first optical path extending from said semiconductor laser array to said optical disc, wherein said beam splitter directs said reflected light from said optical disc in a direction away from said first optical path.

23. The optical pick-up of claim 22, wherein said second optical system includes a second optical path along which said 2-part half wavelength, said polarizer and said applying means are arranged.

24. The optical pick-up of claim 23, wherein said applying means includes a condenser lens disposed at said second optical path to receive said reflected light beam from said polarizer and a cylindrical lens disposed also at said second optical path to receive said reflected light beam from said condenser lens.

25. The optical pick-up of claim 23, wherein said applying means includes a pair of cylindrical lenses disposed at said second optical path with their generatrix axes extending perpendicular to each other.

* * * * *